United States Patent
Hinsberger et al.

(10) Patent No.: US 7,125,196 B2
(45) Date of Patent: Oct. 24, 2006

(54) SECURING DEVICE FOR REAR WALLS OF CABINET FURNITURE

(75) Inventors: Thomas Hinsberger, Schiffweiler (DE); Stefan Ruppert, Homburg (DE); Edwin Müürmann, Waldmohr (DE)

(73) Assignee: CS Schmalmöbel GmbH & Co. KG(DE)

( * ) Notice: Subject to any disclaimer, the term of this patent is extended or adjusted under 35 U.S.C. 154(b) by 0 days.

(21) Appl. No.: 10/763,556

(22) Filed: Jan. 23, 2004

(65) Prior Publication Data
US 2005/0084323 A1    Apr. 21, 2005

(30) Foreign Application Priority Data
Oct. 16, 2003   (DE) .............................. 103 48 264

(51) Int. Cl.
*F16B 12/46*   (2006.01)
(52) U.S. Cl. .................. 403/403; 403/231; 403/382; 312/257.1; 312/263; 312/265.5
(58) Field of Classification Search ............ 403/230, 403/231, 382, 403; 312/263, 265.5, 257.1; 211/182, 189; 248/200, 300
See application file for complete search history.

(56) References Cited

U.S. PATENT DOCUMENTS

| | | | | |
|---|---|---|---|---|
| 4,032,242 A | * | 6/1977 | Morris ....................... 403/231 |
| 4,432,590 A | * | 2/1984 | Lawrence et al. ....... 312/265.4 |
| 5,685,662 A | * | 11/1997 | Rollin et al. ................ 403/231 |
| 6,481,177 B1 | * | 11/2002 | Wood ........................ 52/656.9 |
| 6,511,251 B1 | * | 1/2003 | Bowell ....................... 403/231 |

* cited by examiner

*Primary Examiner*—Daniel P. Stodola
*Assistant Examiner*—Michael P. Ferguson
(74) *Attorney, Agent, or Firm*—Bourque & Associates

(57) ABSTRACT

A securing device for rear walls set in grooves of cabinet furniture exhibits at least one support element that can be placed in the angle area between the rear wall and a grooved sidewall and at least one other support element that can be placed in the angle area between the rear wall and a grooved shelf and/or top board. The support elements (10) exhibit contact sides that are each at a right angle to one another and diagonal to these contact sides a throughhole (12) for receiving a setscrew or a set pin. For purposes of easier handling and more reliable securing of the cabinet furniture elements, which are to be connected to one another in the corner area at an angle of 90 degrees, the at least two support elements (10) are integrated in one piece into the two legs (2) of a corner angle piece. At least one of the support elements (10) is formed at each of the legs (2) of the corner angle piece.

18 Claims, 3 Drawing Sheets

SECURING DEVICE FOR REAR WALLS OF CABINET FURNITURE

Figure 1:
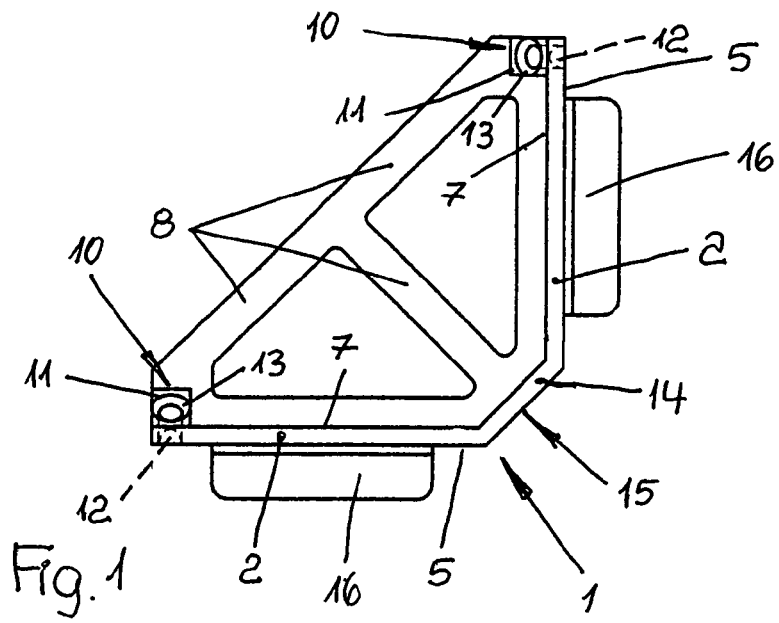

The invention relates to a securing device of the kind designated in greater detail in the main subject of patent claim 1.

In the known design, such securing devices are single elements in the form of small blocks or brackets, which are set in the area of the rear inner corner between the rear wall and the ledge of the sidewalls and the shelves, with said ledge remaining behind the rear wall, in order to mount them using screws or nails, which are to be inserted through the diagonal through holes. In this manner, the rear wall and the respective shelf or top board and each sidewall of a cabinet are secured to one another at an angle of 90 degrees.

Handling such small securing devices is difficult, and there is the risk that when the securing device is not placed properly, the rear ledge will break away at the respective shelf or sidewall of the cabinet, when the setscrew is inserted or the nail is hammered in. Since the grooves at the sidewalls and the shelf of the cabinet are typically wider by a certain play than the thickness of the rear wall to be held, there is the additional difficulty of securing the rear wall without play using the known small securing devices.

It is, therefore, the objective of the invention to create a securing device of the kind mentioned above that is easier to handle, and when erecting cabinet furniture, in particular ready-to-assemble furniture, make it possible to achieve a more reliable securing of the cabinet furniture elements, namely the rear wall, the shelf or the top board as well as the respective sidewall, which are to be connected in each corner area at an angle of 90 degrees to one another.

This objective is achieved according to the invention with a securing device of the kind mentioned above through the characteristic feature of patent claim 1.

It is important for the invention that the corner angle piece possessing at least two support elements that are integrated in the corner angle piece, be a larger component, which is easier to handle and which can be easily n placed at the rear on the rear wall of the respective cabinet furniture in the corner between the rear wall, the respective shelf or top board and the adjacent sidewall, and then attached by inserting the setscrews or the nails. In this manner, the rear wall is, on the one hand, secured to the shelf or the top board, for short also called top, and on the other hand to the adjacent sidewall, such that the sidewall and the shelf are also arranged at an angle of 90 degrees relative to one another. This significantly facilitates the erection of ready-to-assemble cabinet furniture that has to be carried out in a do-it-yourself manner. Thus, when assembling a shelf or a top board, a sidewall and the rear wall, which is inserted in the groove, one already achieves a great stability after attaching the securing device subject to the invention to the corner area of the cabinet furniture formed in this manner and an angle accuracy of these three elements relative to one another, which facilitates the assembly of the additional parts of the cabinet furniture. It is typically sufficient, to provide one securing device each in the areas of two corners of the rectangular or square rear wall, where said corners are diagonally opposite to one another in order to provide sufficient stability for the cabinet furniture.

Advantageous design features of the invention are covered in the sub claims. Particular mention should be made of the spring-like bars, which are attached protruding to the outside at the strike sides of the legs of the corner angle piece that are located away from one another. These bars have a thickness such that they can be inserted into the groove next to the rear wall, which is received by said groove of the respective shelf or top board and the adjacent sidewall in order to eliminate the play of the rear wall, which—as mentioned—is typically less wide than the grooves receiving it due to the required tolerances.

Figure 2:
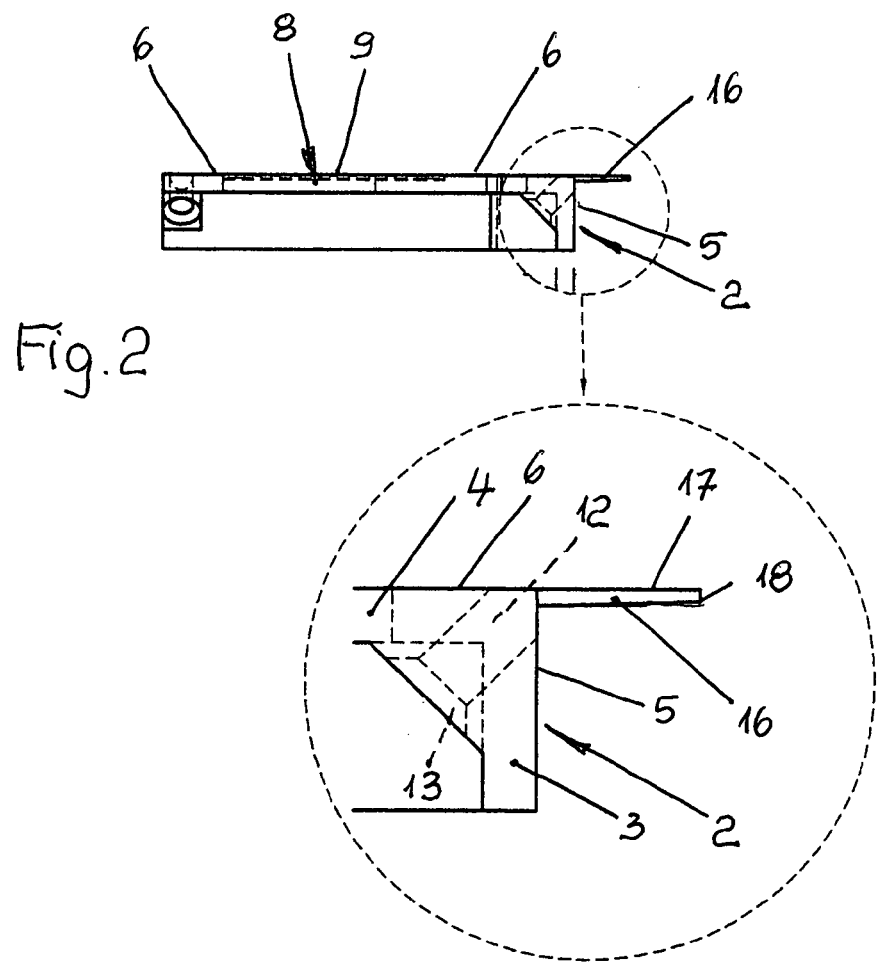
Figure 3:
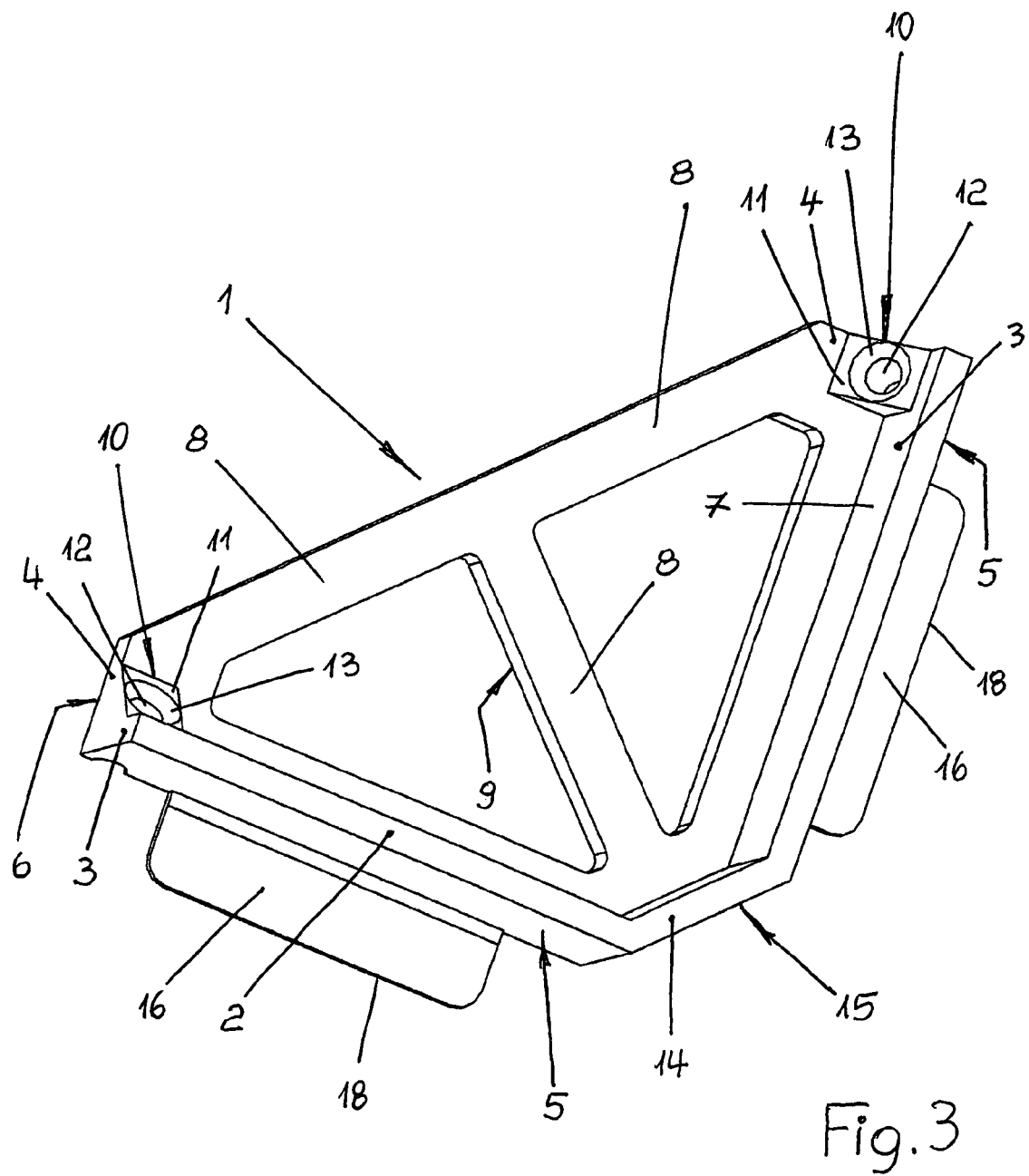
Figure 4:
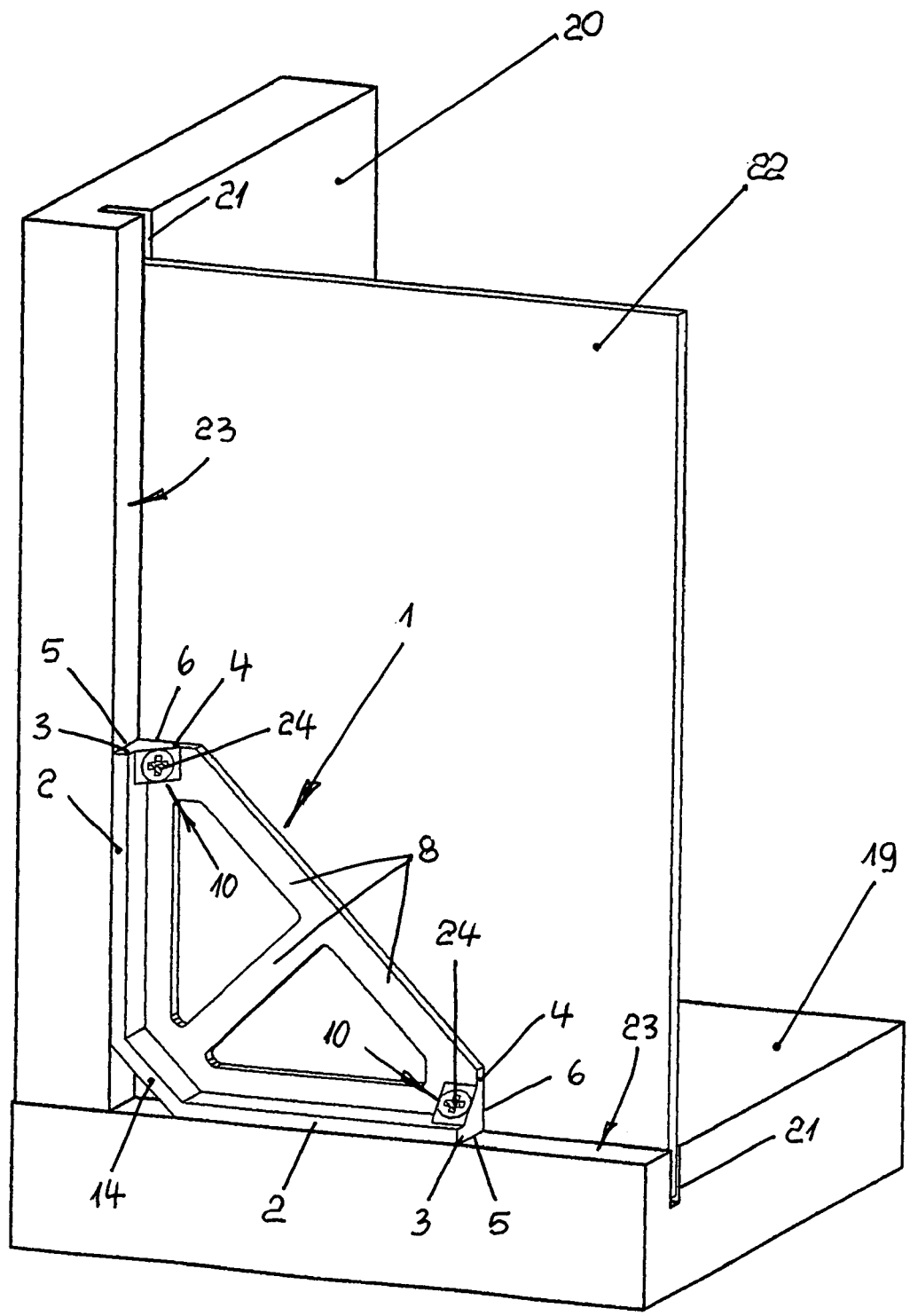

In the following, the invention is explained in greater detail based on an exemplary embodiment and the drawings of which FIG. 1 is a side view of a securing device, FIG. 2 is a top view of the securing device according to FIG. 1, with the circled details shown in a magnified view, FIG. 3 is a perspective view of the securing device according to FIGS. 1 and 2, and FIG. 4 is a perspective view of the installed position of the securing device according to the previous Figures.

In detail, FIG. 1 shows a one-piece corner angle piece 1 with two legs 2 that are perpendicular to one another. As becomes apparent from the magnified view in FIG. 2 and the perspective view of FIG. 3, each of the two legs 2 of the corner angle piece 1 consists of an angle profile that is formed from two support bars 3, 4, which are arranged perpendicular to one another. Toward the outer sides, these support bars 3, 4 each exhibit strike sides 5, 6, which also run perpendicular to one another. As in particular, FIG. 3 reveals, the strike sides 5 formed at the support bars 3 of the legs 2 of the corner angle piece 1, are located away from each other and are at an angle of 90 degrees to one another. Contrary, the strike sides 6, which are present at the support bars 4 of the legs 2 of the corner angle piece 1, are located in one common plane.

At their inner sides, the two legs 2 of the corner angle piece 1 are connected to one another using bracing bars 8, however, a continuous board can be provided in their place as well. The bracing bars 8 follow the support bars 4 and exhibit the same thickness as the support bars 4 of the legs 2. The wider outer sides 9 of the bracing bars 8 are located in one common plane with the strike sides 6 of the support bars 4 of the legs 2, as can be seen in particular from the smaller view of FIG. 2. The legs 2 have, at their free ends, an ending surface that is perpendicular to their longitudinal stretch with the bracing bars 8 of the corner angle piece 1, which connect the legs 2, not protruding from said end surfaces.

In addition, the legs 2 of the corner angle piece 1 exhibit at their free ends specially shaped support elements 10, which, regardless of the remaining design of the legs 2 of the corner angle piece 1, basically can function as securing devices for the intended purpose of the application. However, in a preferred design, they are integrated in the legs 2 of the corner angle piece 1 as shown in the drawing, and protrude with their inner end area in the gusset space, the inner corner area, between the support bars 3, 4 of the legs 2. Thus, the integrated support elements 10 exhibit a rear face area 11 that stretches at a 45 degree angle to the support bars 3, 4 of the legs 2, and which thus is perpendicular to the diagonal plane of the inner corner between the bracing bars 8 and the respective leg 2. Arranged in the direction of the diagonals of the inner corners between the support bars 3, 4 of the respective leg 2 is a throughhole 12, which expands to an insertion opening 13 at the face side 11 of the protruding, thicker area of the support elements 10. The throughhole 12 stretches to the outer corner edge between the support bars 3, 4 of the legs 2 and is used for receiving a means of attachment, which shall be addressed below.

The legs 2 of the corner angle piece 1 merge by means of an interim bar 14, which forms an outer flat portion 15 at the crest of the corner angle piece 1. In addition, spring-like bars 16 are attached to the corner angle piece 1 at the outer sides of the legs 2, where said spring-like bars exhibit a flat longitudinal side 17, which is located in a common plane with the strike sides 6 of the support bars 4 of the legs 2 and the outer sides 9 of the bracing bars 8 that connect the legs 2. The spring bars 16 taper off in a wedge shape toward the longitudinal edges 18, which run freely parallel to the longitudinal direction of the legs 2.

FIG. 4 illustrates the purpose of a corner angle piece 1 of the kind described above, which serves as a securing device for cabinet furniture. FIG. 4 presents one of the lower corner areas of such a piece of cabinet furniture. For example, one can recognize a board 19, namely a so-called bottom board that has placed upon it a sidewall 20 of the cabinet furniture in a perpendicular arrangement. The board 19 and the sidewall 20 to be secured to it at a right angle exhibit grooves 21 that have been cut into them near their rear narrow side areas and parallel to them for this purpose, where both grooves merge in a common plane. In this manner, a rectangular rear wall 22 can be received by these grooves 21, where said wall typically has a width that is slightly smaller relative to the width of the grooves 21.

Viewed from the front of the cabinet furniture, there is a ledge 23 of the board 19 and the wall 20 behind the placed and grooved-in rear wall. The corner angle device 1 serving as a securing device is placed on this ledge 23, in fact, with the strike sides 5 of its legs 2 that are at an angle of 90 degrees to one another. This occurs in a manner such that the spring-like bars 16, which protrude outwards at the two legs, engage in the grooves 21 of the board 19 and the sidewall 20 at the corner angle piece 2 adjacent to the rear wall 22. Due to the wedge effect of the spring-like bars 16, the rear wall 22 is at the same time suspended play-free in the grooves in the area of the corner angle piece 1, whereby said corner angle piece contacts the rear wall together with the strike sides 6 of its legs 2 as well as the flat outer sides 9 of its bracing bars 8. Thereafter, a screw 24 each is screwed into the integrated support elements 10 of the legs 2, which, therefore, together act as support members, through the throughhole 12 all the way to the material of the rear wall 22 and of the board 19 or the sidewall 20, respectively. This can occur only if the board 19 and the sidewall 20 are oriented precisely at a right angle to one another and are stabilized in relation to one another at the correct angle via the corner angle piece 1 as well as the secured rear wall in the groove.

The invention claimed is:

1. A securing device for rear walls set in grooves of cabinet furniture, the cabinet furniture including a sidewall, a grooved board and a rear wall, said sidewall and grooved board arranged perpendicular to one another and each including a groove for receiving said rear wall, said groove of said sidewall and said grooved board disposed in one common plane; the securing device including at least one first support element placed in an angle area between the rear wall and the grooved sidewall and at least one second support element placed between the rear wall and the grooved board, wherein the at least one first and second support elements are integrated in one piece into two legs of a corner angle piece, and wherein said legs are at a right angle to one another, and whereby one of the at least one first and second support elements is formed at each of the legs whereby the first and second support elements each have: contact sides at a right angle to one another and wherein one contact side from each of the first and second support elements directly engages the rear wall; a through hole for receiving a screw or set pin, diagonal to the contact sides; and a bar protruding transversely, wherein the bars have longitudinal sides, and one of the longitudinal sides of each bar for each of the legs is planar with the rear wall and engages the grooved sidewall or grooved board, respectively.

2. A securing device as set forth in claim 1, wherein the legs of the corner angle piece including the at least one first and second support elements have support bars at a right angle to one another and including strike sides, wherein the strike sides contact the contact sides of each support element, whereby the strike sides of both legs that are located at the same side of the corner angle piece are in one common plane.

3. A securing device as set forth in claim 2, wherein an end region of the at least one first and second support elements is attached and protruding to an inner side of the legs of the corner angle piece and having a face side perpendicular to a diagonal plane of the inner corners between the support bars of the legs and proximate an insertion opening of the respective through hole.

4. A securing device as set forth in claim 2, further including bars protruding transversely from the legs, wherein the bars have longitudinal sides, and wherein one of the longitudinal sides of the bars for each of the legs is planar with the strike side of the legs of the corner angle piece located in the same plane.

5. A securing device as set forth in claim 4, wherein the bars are spring-like and taper off in a wedge shape toward a distal, longitudinal edge.

6. A securing device assembly as set forth in claim 5, wherein the corner angle piece is a synthetic injection molded part.

7. A securing device as set forth in claim 1, wherein the corner angle piece has a crest area, wherein the crest area has a flat region toward an outside area, and wherein the legs are operatively connected to each other via an interim bar at an angle with respect to the legs.

8. A securing device as set forth in claim 7, wherein the legs of the corner angle piece are of approximately the same length, and wherein the through holes of the at least one first and second support elements are arranged at each of the legs at equal distances from the crest area of the corner angle piece.

9. A securing device as set forth in claim 8, wherein the through holes of the support elements are arranged at distal ends of the legs of the corner angle piece.

10. A securing device as set forth in claim 1, wherein the legs in an inner area of the corner angle piece are connected to one another using one-piece attached bracing bars.

11. A securing device as set forth in claim 10, wherein the bracing bars of the corner angle piece have planar outer sides, and wherein the outer sides are planar with the strike sides of the legs of the corner angle piece and are in one plane with said strike sides.

12. A securing device for cabinet furniture comprising:
piece of a cabinet furniture including a sidewall, a grooved board and a rear wall, said sidewall and grooved board arranged perpendicular to one another and each including a groove for receiving said rear wall, said groove of said sidewall and said grooved board disposed in one common plane;
a securing device comprising a first support element and a second support element wherein the first and second support elements are integrated in one piece into two legs of a corner angle piece whereby one of the first and second support elements is formed at each of the legs and the first support element and second support element each have: a bottom strike surface and a side strike surface whereby the bottom strike surface of each support element are within the same plane and the side strike surface of each support element are in planes that intersect each other; a through hole for receiving a screw or set pin; and a bar protruding transversely from and coupled to the side strike surface of each of the first and second support element, wherein the bars each have longitudinal edges, and the bars for each of the legs tapers off in a wedge shape towards a longitudinal edge opposite the longitudinal edge coupled to the support element.

13. The securing device assembly as set forth in claim 12, wherein the first and second support elements are at a right angle to one another.

14. The securing device assembly as set forth in claim 12, wherein the first support element and the second support element are integrated in one piece into a corner angle piece wherein the corner angle piece has a crest area, wherein the crest area has a flat region toward an outside area, and wherein the legs are operatively connected to each other via an interim bar at an angle with respect to the legs.

15. The securing device assembly as set forth in claim 14, wherein the legs of the corner angle piece are of approximately the same length, and wherein the through holes of the first and second support elements are arranged at each of the legs at equal distances from the crest area of the corner angle piece.

16. The securing device assembly as set forth in claim 12, wherein one of a bottom side of the bar for each of the legs and the bottom strike surface of the legs are located in the same plane.

17. The securing device assembly as set forth in claim 12, wherein the bars are spring-like.

18. A securing device for rear walls set in grooves of cabinet furniture, the securing device including at least one first support element placed in an angle area between a rear wall and a grooved sidewall and at least one second support element placed between the rear wall and a grooved board, wherein the at least one first and second support elements are integrated in one piece into two legs of a corner angle piece, and wherein said legs are at a right angle to one another, and whereby one of the at least one first and second support elements is formed at each of the legs whereby the first and second support elements each have: contact sides at a right angle to one another; a through hole for receiving a screw or set pin, diagonal to the contact sides; and a bar protruding transversely, wherein the bars have longitudinal sides, and one of the longitudinal sides of each bar for each of the legs is planar with the rear wall and engages the grooved sidewall or grooved board, respectively; wherein the legs of the corner angle piece including the at least one first and second support elements have support bars at a right angle to one another and including strike sides, wherein the strike sides contact the contact sides of each support element, whereby the strike sides of both legs that are located at the same side of the corner angle piece are in one common plane; and wherein an end region of the at least one first and second support elements is attached and protruding to an inner side of the legs of the corner angle piece and has a face side perpendicular to a diagonal plane of the inner corners between the support bars of the legs and proximate an insertion opening of the respective through hole.

* * * * *